:::
United States Patent [19]

Leib et al.

[11] Patent Number: 5,170,289

[45] Date of Patent: Dec. 8, 1992

[54] OPTICAL CORRELATOR CONSOLE

[75] Inventors: Kenneth G. Leib, Wantagh; Edward V. Sullivan, Huntington Station, both of N.Y.

[73] Assignee: Grumman Aerospace Corporation, Bethpage, N.Y.

[21] Appl. No.: 649,492

[22] Filed: Feb. 1, 1991

[51] Int. Cl.$^5$ .................. G03H 1/16; G03H 1/22; G06K 9/68

[52] U.S. Cl. ...................... 359/561; 359/559; 359/49; 359/29

[58] Field of Search ............... 350/163.12, 163.13, 350/163.14; 359/559, 560, 561, 1, 15, 20, 22, 29, 19; 382/31, 42

[56] References Cited

U.S. PATENT DOCUMENTS

| | | | |
|---|---|---|---|
| 3,944,978 | 3/1976 | Jensen et al. | 350/162.13 X |
| 4,802,718 | 2/1989 | Leib et al. | |
| 4,809,340 | 2/1989 | Mersereau | 350/162.13 X |
| 4,929,056 | 5/1990 | Leib et al. | |
| 4,932,741 | 6/1990 | Pernick et al. | 350/162.13 |
| 4,936,655 | 6/1990 | Leib et al. | |
| 4,941,733 | 7/1990 | Leib | 350/162.13 |
| 4,972,498 | 11/1990 | Leib | |
| 4,980,922 | 12/1990 | Leib | |
| 4,982,408 | 1/1990 | Pernick et al. | 350/162.13 X |
| 4,993,809 | 2/1991 | Leib et al. | |

OTHER PUBLICATIONS

Duthie et al., "Compact Real-Time Coherent Optical Correlators", Optical Engineering, vol. 23, No. 1, Jan.-/Feb. 1984 pp. 7-11.
Leib, Contractor's Report, RE-670, "Investigation and Implementation of Optical Memory for a Correlator Seeker," Jul. 1983.
Mendelsohn et al., AFWAL-TR-83-1206, "Optical Correlation Module Design Study," Feb. 1984.
Leib, "Calibration of Output Plane in a Holographic System" SPIE Conference, Jan. 1988.

Primary Examiner—Constantine Hannaher
Assistant Examiner—Edward J. Glick
Attorney, Agent, or Firm—Scully, Scott, Murphy & Presser

[57] ABSTRACT

An optical correlator console for mounting and assembling the components of an optical correlator system in a unique stable, compact and functional configuration in which all of the components are mounted in a compact configuration on upper and lower sides of a base support plate. The components which do not ordinarily require accessibility are mounted below the support plate and the components which ordinarily require accessibility during operation and use of the optical correlator are mounted above the support plate. The lower side of the support plate mounts a laser source and a collimator along with several other incidental optical components, with the laser source providing a laser beam as an input to the collimator which provides an expanded and collimated optical beam. The additional incidental optical elements can include a spatial filter and a shutter mounted interposed between the laser source and the collimator. An image modulation means is provided for modulating the optical beam with image information, either by a film image in a film gate mounted on the upper side of the support plate in a first embodiment, or by a spatial light modulator mounted on the lower side of the support plate in a second embodiment. A periscope mirror assembly transfers the optical beam from the lower to the upper side of the base support plate. The upper side of the support plate mounts a multiple holographic lens, a multiple matched filter memory, an inverse Fourier transform lens and a detector. The multiple holographic lens replicates the optical beam to produce multiple optical beams which are directed onto the multiple matched filter memory, the output of which is directed through the inverse Fourier transform lens means to the detector.

6 Claims, 3 Drawing Sheets

:::

OPTICAL CORRELATOR CONSOLE

BACKGROUND OF THE INVENTION

1. Field of the Invention

The present invention relates generally to an optical correlator console for mounting and assembling all of the components of an optical correlator system utilized to examine film or other input image data to detect images of targets or objects of interest in the film or input image data.

More particularly, the subject invention pertains to an optical correlator console for mounting and assembling the components of an optical correlator system in a unique stable, compact and functional configuration in which all of the components are mounted in a compact configuration on upper and lower sides of a base support plate.

2. Discussion of the Prior Art

In the optical correlator, several of the individual components and operational aspects of the system have been patented or are the subject of pending patent applications including: a matched filter holder using a plastic frame to hold a matched filter plate as described in U.S. Pat. No. 4,802,718; apparatus for opening and holding a frame and for mounting an optical element in a frame as disclosed in U.S. Pat. No. 4,929,056; an alignment fixture for an optical instrument as described in U.S. Pat. No. 4,936,655; an output plane calibration system for an optical correlator as described in U.S. patent application Ser. No. 200,599, filed May 31, 1988, now U.S. Pat. No. 4,980,922; an alignment system for an optical matched filter correlator as disclosed in U.S. patent application Ser. No. 216,399, filed Jul. 7, 1988, now U.S. Pat. No. 4,972,498; a mounting fixture for a multiple holographic lens an optical correlator as disclosed in U.S. patent application Ser. No. 255,047, filed Oct. 7, 1988, now U.S. Pat. No. 4,993,809; and an automatic laser beam expander and pinhole alignment system as disclosed in patent application Ser. No. 551,910, filed Jul. 12, 1990.

SUMMARY OF THE INVENTION

Accordingly, it is a primary object of the present invention to provide an optical correlator console for mounting and assembling in a stable, compact and functional manner all of the components of an optical correlator.

A further object of the subject invention is the provision of an optical correlator console constructed on a base support plate defining upper and lower support sides. The components which do not ordinarily require accessibility are mounted below the support plate and the components which ordinarily require accessibility during operation and use of the optical correlator are mounted above the support plate, which provides a particularly compact, stable and functional mounting arrangement. In operation, the components of an optical correlator as disclosed herein must be mounted in a very stable manner to minimize undesired vibrations and movements which would degrade performance of the optical instrument, and shock mounting of the instrument might also be provided to minimize environmental interference. Accordingly, the design disclosed herein of a single compact mounting base should minimize the adverse effects of undesired environmental vibrations and movements. In a preferred embodiment, the mounting base is preferably constructed in a console and provided with a removable cover thereover to reduce the adverse effects of dust and moisture.

The lower side of the support plate mounts a laser source and a collimator along with several other incidental optical components, with the laser source providing a laser beam as an input to the collimator which provides an expanded and collimated optical beam. The additional incidental optical elements can include a spatial filter and a shutter mounted interposed between the laser source and the collimator.

An image modulation means is provided for modulating the optical beam with image information, either by a film image in a film gate mounted on the upper side of the support plate in a first embodiment, or by a spatial light modulator mounted on the lower side of the support plate in a second embodiment. A periscope mirror assembly transfers the unmodulated optical beam in the first embodiment and the modulated optical beam in the second embodiment from the lower to the upper side of the base support plate.

The upper side of the support plate mounts a multiple holographic lens, a multiple matched filter memory, an inverse Fourier transform lens and a detector, along with several other incidental optical components. The multiple holographic lens replicates the optical beam to produce multiple optical beams which are directed onto the multiple matched filter memory, the output of which is directed through the inverse Fourier transform lens means to the detector.

Two embodiments of the optical correlator console have been designed as the first embodiment has film as an input medium, while the second embodiment has digital or video signals as the input medium. The transfer of optical information and beams from the lower to the upper level of the correlator is achieved by a periscope mirror assembly in both the first and second embodiments.

In greater detail, in a first embodiment of the present invention the image modulation is provided by a film image mounted in a film gate on the upper side of the support plate which receives the optical beam from the periscope mirror assembly. The periscope mirror assembly includes a first mirror on the lower side of the support plate, which reflects the optical beam from the collimator to a second mirror on the upper side of the support plate, which reflects the optical beam onto the film image mounted in the film gate.

The second embodiment includes a spatial light modulator mounted on the lower side of the support plate, with the spatial light modulator receiving the optical beam from the collimator and modulating it with optical image information present in digital or video signals. The image modulated beam is then directed to the periscope mirror assembly for transfer to the upper side of the support plate. The periscope mirror assembly includes a beamsplitter on the lower side of the support plate which directs the optical beam to the spatial light modulator and receives an image modulated beam returned therefrom. The beamsplitter then directs the image modulated beam to the upper side of the support plate to an upper mirror of the periscope mirror assembly which redirects the beam to the multiple holographic lens.

In accordance with the teachings herein, the present invention provides a unique configuration for an optical correlator wherein in first and second embodiments a laser, spatial filter, and collimator are located in the lower part of the assembly. In both embodiments a multiple holographic lens, a multiple matched filter memory, an inverse Fourier transform lens and other correlation plane detector elements are located on the upper level of the assembly.

BRIEF DESCRIPTION OF THE DRAWINGS

The foregoing objects and advantages of the present invention for an optical correlator console may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
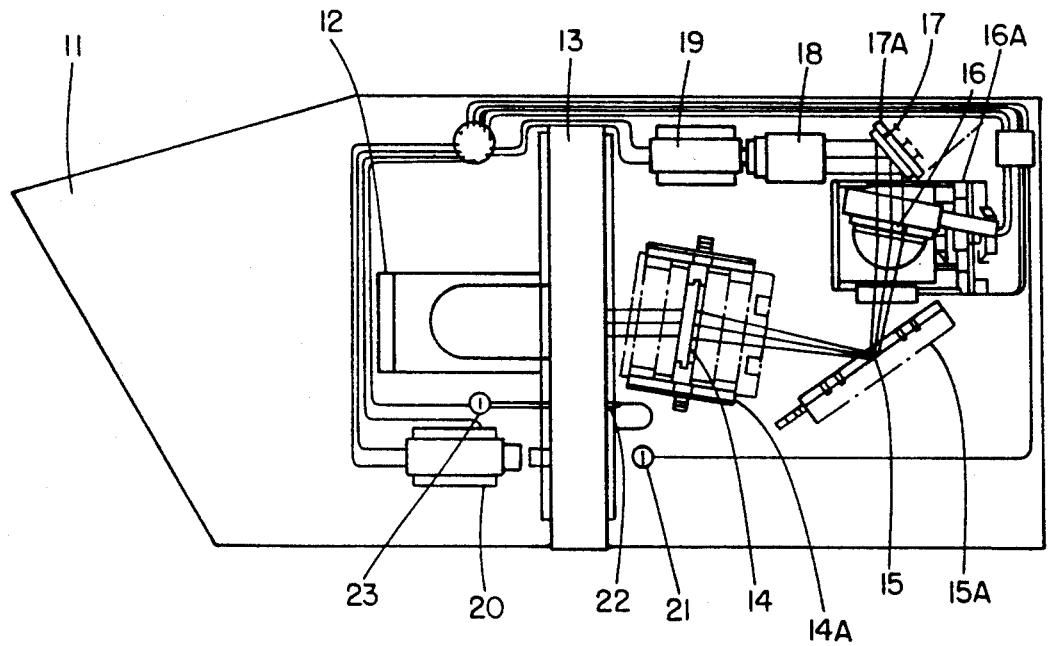
FIGS. 1 and 2 illustrate respectively plan views of the upper and lower levels of a first embodiment of an optical correlator console pursuant to the present invention in which image information is supplied by a film image positioned in a film gate.
Figure 2:
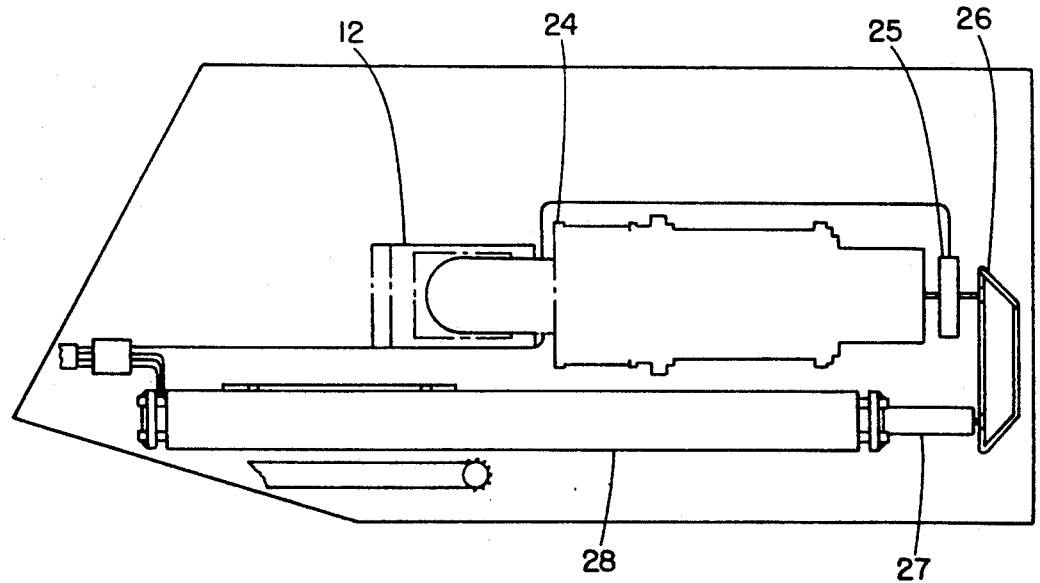

Referring to the drawings in detail, FIGS. 1 and 2 illustrate respectively plan views of the upper and lower levels of a first embodiment of an optical correlator console pursuant to the present invention in which image information is supplied by a film image positioned in a film gate 13. Referring initially to FIG. 2, a laser 28 provides a laser beam which is spatially filtered and pre-expanded by a spatial filter 27, and then directed by mirrors in an assembly 26 through a control shutter 25 to a collimator 24 wherein the beam is collimated and expanded to an appropriate size to illuminate the maximum film size accommodated by the film gate 13. The laser 28 is a standard OEM laser with a mounting fixture designed for the console. The mounting fixture has screw adjustments for any height alignment, in one design set at 114.3 mm. The collimator 24 is preferably designed to provide apodizing compensation for the optical beam such that it is uniform in intensity over approximately 90 percent of the full beam diameter. All of these elements are part of the lower level as shown in the plan view and are mounted on and suspended from the base support plate 11. Although, it should be noted that in alternative embodiments some of these components could be mounted on the upper level in which they would be supported on top of the support plate 11.

Figure 3:
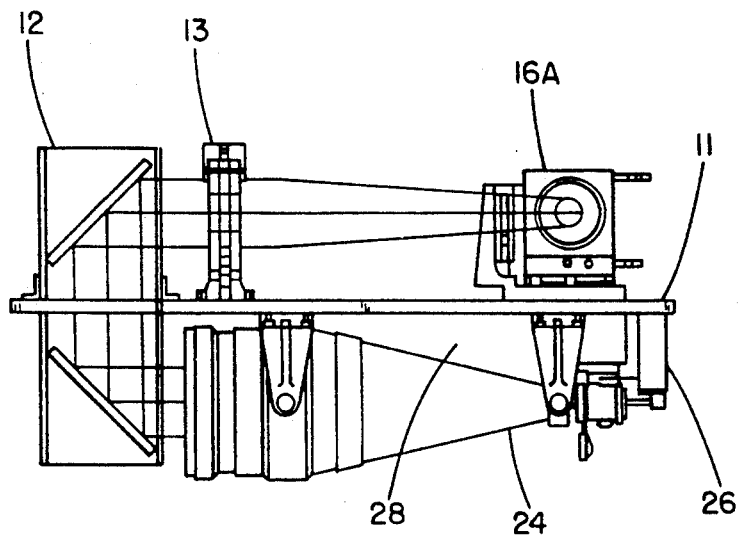
FIG. 3 is a side elevational view of the first embodiment of FIGS. 1 and 2 and illustrates the operation of the periscope mirror assembly.
Figure 4:
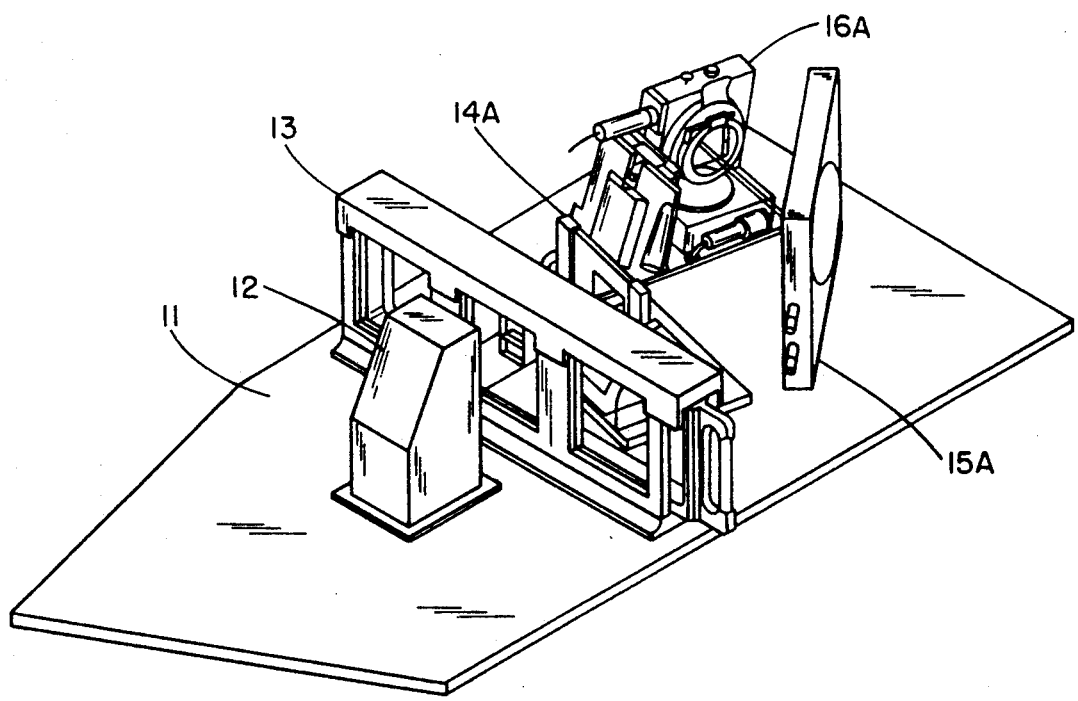
FIG. 4 is an isometric view of the upper level of the first embodiment showing a perspective view of the components on the upper level of the optical correlator.

The output optical beam from the collimator 24 is directed through the support plate 11 by upper and lower mirrors of a mirror periscope assembly 12, as illustrated best in FIG. 3. Referring next to FIG. 1, the output beam from the upper mirror of the periscope assembly 12 is directed through an input film gate 13 where the film of interest is positioned to image modulate the laser beam. The modulated laser beam is then directed through a multiple holographic lens (MHL) 14 in a MHL Holder 14A where a Fourier transform operation on the beam is replicated in multiple beams which are reflected by a mirror 15 in a mirror holder 15A onto a multiple array of matched filters in a memory 16 in matched filter holder 16A. The correlation output from the matched filter array 16 is reflected by a mirror 17 in mirror holder 17A and directed to an inverse Fourier transform lens 18, the output of which is focussed upon a detector, typically a CCD video camera 19 to provide for correlation plane processing. FIG. 4 is an isometric view of the upper level of the first embodiment showing a perspective view of the components of the optical correlator and their respective holders.

Referring to FIG. 1, components 20, 21, 22 and 23 constitute an image capture subsystem in which the film gate is detented before full closure. When the film gate is in a "half closed" position, a light source 23 is activated, and a detector 22 is actuated thereby through a small aperture in the film gate positioned in front of the detector (only when the gate is in a half closed position) to sense that position, and generates a signal for the computer so that image capture operations can be implemented. In the image capture subsystem, a light source 21 directs light towards the input film gate 13 to a camera 20. The image capture subsystem operates as follows. After a film to be analyzed is inserted into film gate 13, the gate is brought to a first detent position whereat detector 22 is actuated and generates a signal indicating that position. The white light source 21 then illuminates the film so that the camera 20 captures the image on the film and stores it in a frame grabber. This image is later used to overlap the correlation plane when desired in order to indicate the position in the film where the correlator has detected a target. After the image has been captured, an external signal gives an indication at which time the operator inserts the film gate 13 to a fully inserted position and normal correlation operations proceed.

Figure 5:
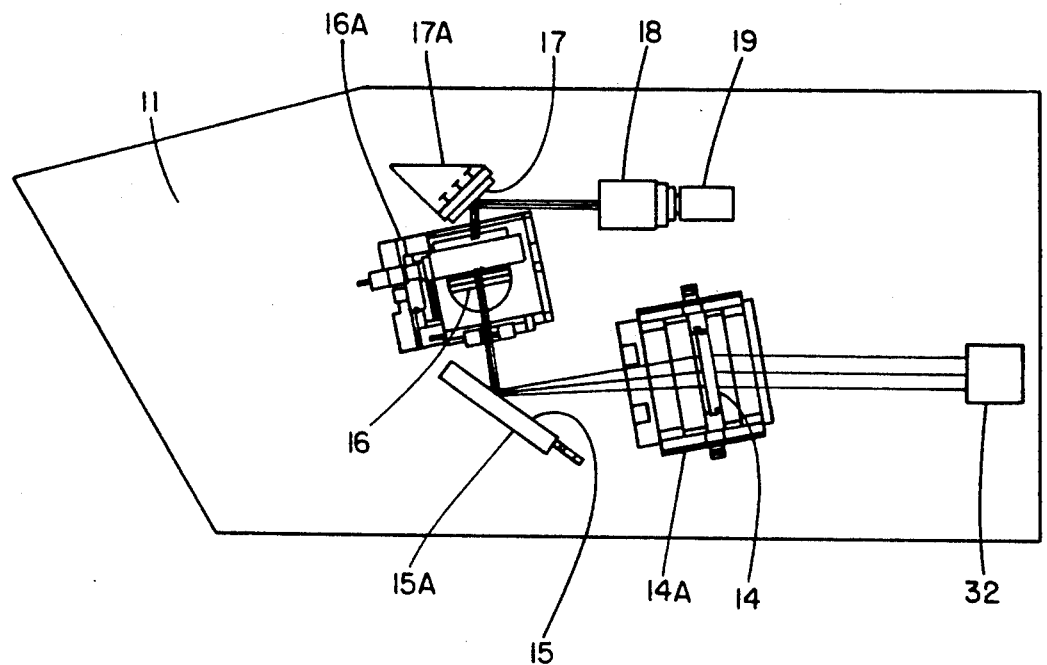
FIGS. 5 and 6 illustrate respectively plan views of the upper and lower levels of a second embodiment of the subject invention in which image information is supplied by a spatial light modulator which receives the image modulation information as digital or video signals.
Figure 6:
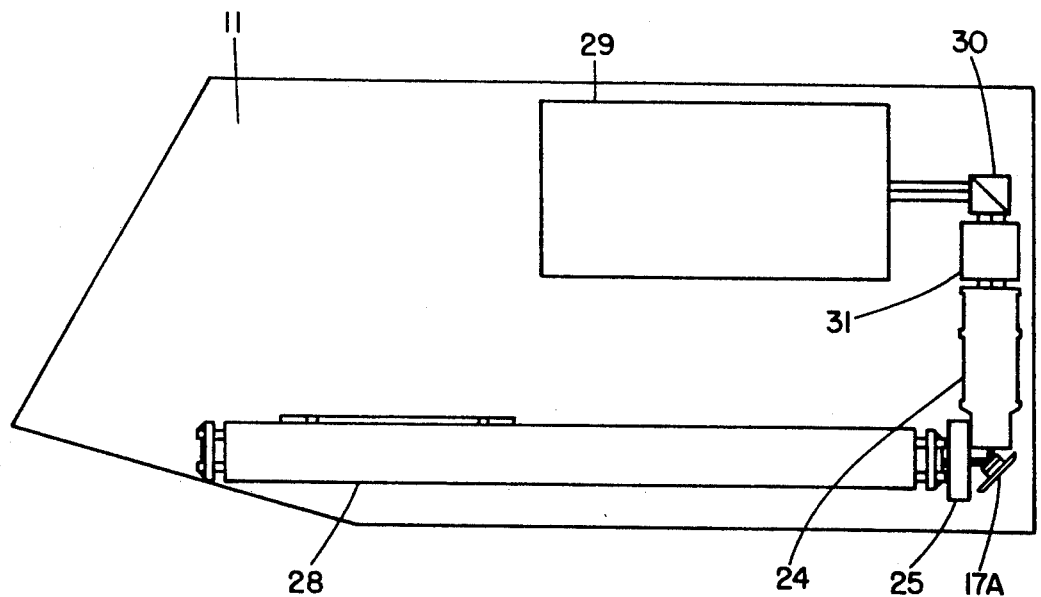

FIGS. 5 and 6 illustrate respectively plan views of the upper and lower levels of a second embodiment of the subject invention in which image information is supplied by a spatial light modulator 29 mounted on the bottom level of the console which receives the image modulation information as digital or video signals. The spatial light modulator 29 is used in the second embodiment to provide an electronically impressed image for processing, and is similar to an image on film except that the image can be erased and another recorded. Referring to FIG. 6, a laser 28 provides a laser beam which is directed through a control shutter 25 and then directed by mirror 17A to a collimator 24 where the beam is collimated and expanded to an appropriate size. The laser 28 is a standard OEM laser. The collimator 24 is preferably designed to provide apodizing compensation for the optical beam such that it is uniform in intensity over approximately 90 percent of the full beam diameter. The output of the collimator is directed through a polarizing cube 31 to a beam splitter 30. The polarization cube 31 enables the image recorded on the SLM to be properly read out. The beam splitter 30 directs a portion of the optical beam to spatial light modulator 29 and receives an image modulated beam returned therefrom. The beamsplitter 30 then directs the image modulated beam to the upper side of the support plate to an upper mirror 32 (see FIG. 5) of the periscope mirror assembly which redirects the beam to the multiple holographic lens 14 in a MHL holder 14A, and image processing then proceeds in a manner similar to the first embodiment. In this embodiment, image capture can be performed directly by electronic transfer to the frame grabber for subsequent usage. The image modulated laser beam is directed by mirror 32 through a multiple holographic lens (MHL) 14 where a Fourier transform operation on the beam is replicated in multiple beams which are reflected by a mirror 15 in a mirror holder 15A onto a multiple array of matched filters in a memory 16. The correlation output from the matched filter array 16 is reflected by a mirror 17 in a mirror holder 19A and directed to an inverse Fourier transform lens 18, the output of which is focussed upon a detector, typically a CCD video camera 19 to provide for correlation plane processing.

While several embodiments and variations of the present invention for an optical correlator console are described in detail herein, it should be apparent that the disclosure and teachings of the present invention will suggest many alternative designs to those skilled in the art.

What is claimed is:

1. An optical correlator console providing a stable, compact and functional mounting for the components of the optical correlator, comprising:
   a. a base support plate defining upper and lower support sides;
   b. said lower side of said base support plate mounting a laser source and a collimator, with the laser source providing a laser beam as an input to the collimator which provides an expanded and collimated optical beam;
   c. a periscope mirror means for transferring the optical beam from the lower side to the upper side of said base support plate;
   d. an image modulation means for modulating the optical beam with image information, said image modulation means comprising a film image mounted in a film gate on the upper side of said support plate which receives the optical beam from said periscope mirror means, and wherein said film gate includes a half closed detent position, which is used in an image capture system, and a fully inserted position, which is used during correlation operations; and
   e. said upper side of said base support plate mounting a multiple holographic lens, a multiple matched filter memory, an inverse Fourier transform lens means and a detector means, wherein said multiple holographic lens replicates the optical beam to produce multiple optical beams which are directed onto the multiple matched filter memory, the output of which is directed through the inverse Fourier transform lens means and is detected by the detector means at a correlation plane, whereby mounting of the major components of the optical correlator on the upper and lower sides of a single compact base support plate provides a stable, compact and functional optical correlator console.

2. An optical correlator console as claimed in claim 1, wherein a special filter and a shutter are mounted interposed between said laser source and said collimator on the lower side of said support plate.

3. An optical correlator console as claimed in claim 1, wherein said periscope mirror means includes a first mirror on the lower side of said support plate which reflects the optical beam from said collimator to the upper side of said support plate, and a second mirror on the upper side of said support plate which reflects the optical beam onto a film image mounted in said film gate.

4. An optical correlator console as claimed in claim 1, wherein said image capture system includes a light source for illuminating the film, a camera for capturing the image on the film, and a frame grabber for storing the image, which stored image is used in subsequent correlation operations to overlap the correlation plane to indicate the position in the film where a correlation target has been detected.

5. An optical correlator console as claimed in claim 1, wherein said multiple holographic lens is mounted in a multiple holographic lens holder which is secured to said base support plate.

6. An optical correlator console as claimed in claim 1, wherein said detector means comprises a video camera.

* * * * *